United States Patent
Xu et al.

(10) Patent No.: US 11,337,122 B2
(45) Date of Patent: May 17, 2022

(54) SWITCH METHOD, TERMINAL AND NETWORK SIDE DEVICE

(71) Applicant: China Academy of Telecommunications Technology, Beijing (CN)

(72) Inventors: Meng Xu, Beijing (CN); Li Chen, Beijing (CN); Jing Liang, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 16/764,848

(22) PCT Filed: Oct. 31, 2018

(86) PCT No.: PCT/CN2018/112838
§ 371 (c)(1),
(2) Date: May 16, 2020

(87) PCT Pub. No.: WO2019/096000
PCT Pub. Date: May 23, 2019

(65) Prior Publication Data
US 2020/0344649 A1 Oct. 29, 2020

(30) Foreign Application Priority Data
Nov. 17, 2017 (CN) .......................... 201711149114.2

(51) Int. Cl.
*H04W 36/00* (2009.01)
*H04W 24/10* (2009.01)
(Continued)

(52) U.S. Cl.
CPC ...... *H04W 36/0055* (2013.01); *H04B 17/382* (2015.01); *H04W 24/10* (2013.01);
(Continued)

(58) Field of Classification Search
CPC .............. H04W 36/0066; H04W 36/30; H04L 12/5692
See application file for complete search history.

(56) References Cited

U.S. PATENT DOCUMENTS

| | | | |
|---|---|---|---|
| 2005/0227691 A1* | 10/2005 | Pecen | H04W 36/0066 455/435.2 |
| 2014/0235243 A1* | 8/2014 | Damnjanovic | H04W 76/10 455/436 |
| 2015/0201356 A1* | 7/2015 | Wang | H04J 11/0069 370/331 |

FOREIGN PATENT DOCUMENTS

| | | |
|---|---|---|
| CN | 101052216 A | 10/2007 |
| CN | 109729559 A | 5/2019 |

(Continued)

OTHER PUBLICATIONS

Samsung "Random Access in RRC Connected: Bandwidth Part Aspects", 3GPP TSG-RAN WG2 #99bis Prague, Czech Republic, Oct. 9-13, 2017, total 3 pages, R2-1710091.

(Continued)

*Primary Examiner* — Joshua L Schwartz
(74) *Attorney, Agent, or Firm* — Kilpatrick Townsend & Stockton, LLP

(57) ABSTRACT

A switch method, a terminal and a network side device are provided. The method a terminal receiving a switch command sent by a network-side device through a source cell, wherein the switch command comprises access bandwidth information; and the terminal accessing a target cell on a determined partial bandwidth according to the access bandwidth information, so that the terminal switches from the source cell to the network-side target cell.

13 Claims, 2 Drawing Sheets

S201
Transmitting a handover command to a terminal through a source cell, where the handover command includes bandwidth access information of a target cell of a network side, so that the terminal accesses the target cell according to the BWP determined by the bandwidth access information and configured to access the target cell S202
Receiving a random access request for accessing the target cell transmitted by the terminal through the BWP, and completing a random access process to enable the terminal to be switched from the source cell to the target cell

(51) Int. Cl.
*H04W 36/08* (2009.01)
*H04W 36/38* (2009.01)
*H04W 74/08* (2009.01)
*H04B 17/382* (2015.01)

(52) U.S. Cl.
CPC ....... *H04W 36/0083* (2013.01); *H04W 36/08* (2013.01); *H04W 36/38* (2013.01); *H04W 74/0833* (2013.01)

(56) References Cited

FOREIGN PATENT DOCUMENTS

| WO | 2011050928 A1 | 5/2011 |
|----|---------------|--------|
| WO | 2011140037 A1 | 11/2011 |
| WO | 2016153026 A1 | 9/2016 |

OTHER PUBLICATIONS

CATT "BWP model", 3GPP TSG-RAN WG2 Meeting #99bis Prague, Czech Republic, Oct. 9-13, 2017, total 3 pages, R2-1710275.

CATT "BWP selection in handover", 3GPP TSG-RAN WG2 #100 Reno, USA, Nov. 27-Dec. 1, 2017, total 3 pages, R2-1712863.

MediaTek Inc. "Summary of Offline Discussion on Bandwidth Part Operation Document for: Discussion", 3GPP TSG RAN WG1 Meeting 90bis Prague, CZ, Oct. 9-13, 2017, total 13 pages, R1-17xxxxx.

Huawei et al., "Control plane impacts for Bandwidth Parts", 3GPP TSG-RAN WG2 Meeting #99bis, Prague, Czech Republic, Oct. 9-13, 2017, total 5 pages, R2-1710457.

ZTE Corporation et al.,"Discussion on the RAN2 impacts with the BWP terminologies introduced in RAN1", 3GPP TSG-RAN WG2 Meeting #100, Reno, USA, Nov. 27-Dec. 1, 2017, total 8 pages, R2-1712601.

3GPP Ts 36.300 V14.4.0, 3rd Generation Partnership Project;Technical Specification Group Radio Access Network; Evolved Universal Terrestrial Radio Access (E-UTRA) and Evolved Universal Terrestrial Radio Access Network (E-UTRAN);Overall description;Stage 2 (Release 14), total 3 pages, Sep. 2017.

Samsung, "RRM for wider bandwidth operations", 3GPP TSG-RAN WG1 NR Meeting #90, Prague, Czech Republic, Aug. 21-25, 2017, total 3 pages, R1-1713572.

Huawei et al., "Definition of Cells for Idle and connected UEs", 3GPP TSG-RAN WG2 Meeting #99bis, Prague, Czech Republic, Oct. 9-13, 2017, total 5 pages, R2-1710216.

* cited by examiner

S101

Receiving a handover command transmitted by a target cell of a network side through a source cell, where the handover command includes bandwidth access information of the target cell; and bandwidth access information is information of the determined BWP configured to access the target cell

S102

Accessing the target cell on a BWP to enable the terminal to be switched from the source cell to the target cell

Transmitting a handover command to a terminal through a source cell, where the handover command includes bandwidth access information of a target cell of a network side, so that the terminal accesses the target cell according to the BWP determined by the bandwidth access information and configured to access the target cell

S202

Receiving a random access request for accessing the target cell transmitted by the terminal through the BWP, and completing a random access process to enable the terminal to be switched from the source cell to the target cell

Fig. 2

Terminal

| Receiving device 301 | Access device 302 |

Fig. 3

SWITCH METHOD, TERMINAL AND NETWORK SIDE DEVICE

The present application is a National Stage of International Application No. PCT/CN2018/112838, filed Oct. 31, 2018, which claims priority to Chinese Patent Application No. 201711149114.2 filed with the Chinese Patent Office on Nov. 17, 2017 and entitled 'Switch Method, Terminal and Network Side Device', and the entire contents of which are incorporated herein by reference.

FIELD

The present disclosure relates to the field of communication, in particular to a handover method, a terminal and network side equipment.

BACKGROUND

In new generation wireless communication systems, for example, in a 5G or NR (New RAT, new radio access technology; and RAT: radio access technology) system, a network bandwidth may be far larger than a terminal transmission bandwidth, a network side divides a network side bandwidth into a plurality of parts, namely a plurality of bandwidth parts (BWPs), one or more BWPs are configured to a terminal, and a part of the BWPs can be activated for transmission. From the terminal, signaling and data only can be transmitted on the activated BWP.

In a traditional long term evolution (LTE) system, a cell bandwidth at the network side is less than or equal to a receiving bandwidth which is 20 MHz of a terminal, so that the network side always configures uplink and downlink total bandwidths of a cell to a terminal, and the terminal can work on the whole cell bandwidth. In the NR system, the network side bandwidth can be as high as 400 MHz, and is far larger than the reception the terminal. Therefore, the concept of BWP is introduced, namely, the large bandwidth of the network side is divided into a plurality of BWPs, one or more BWPs are configured to the terminal, and the partially configured BWPs are activated for uplink and downlink transmission for the terminal, the activated downlink BWPs are called active downlink (DL) BWPs, and the activated uplink BWPs are called active uplink (UL) BWPs. In Version R15, only one DL BWP and one UL BWP are allowed to be activated at a time for the terminal, and the inactivated BWP cannot carry out uplink and downlink signaling and data transmission.

The network side may be configured with a plurality of BWPs, but for each user equipment (UE), a primary cell (PCell), a primary secondary cell (PScell) and each secondary cell (SCell) separately have associated synchronized signal blocks (SSBs) at the corresponding frequency points as cell-level SSBs, where the cell-level SSBs can serve as a time reference of a serving cell and SSBs measured by radio resource management (RRM) of the serving cell. During measurement of the UE, each SS block frequency point which needs to be measured needs to be configured as a separate measurement object. When the UE initially accesses the cell, the UE can access an initial BWP, and can complete a random access process. The network side may configure a plurality of BWPs for the UE, and may configure a default BWP, and selecting which BWP to activate or deactivate is implemented by a bottom layer and not perceived by a high layer.

Initial BWP: for an initially accessed terminal, a connection setup procedure can only be completed by using the initial BWP. The initial BWP includes basic cell broadcast signaling, random access resources and the like.

Default BWP: a base station of the network side can configure a default BWP for the terminal in a connected state, and the terminal can perform some basic work on the default BWP, such as maintaining cell connection, performing cell measurement and initiating random access.

Configured BWP: the network side configures BWP for a single terminal in the connected state, and various BWPs may have different configuration contents, such as physical uplink control channel (PUCCH) configuration and semi-persistent scheduling (SPS) configuration. The DL BWP and the UL BWP may be configured separately.

Active BWP: in the BWP configured for the network side, the terminal performs uplink and downlink transmission only by using the active BWPs. The active BWP includes an active DL BWP and an active UL BWP.

When handover is carried out, the UE reports a measurement report to the network side, the network side triggers handover by judging a measurement result, and a source cell transmits the configuration information of the UE to a target cell through a handover preparation message, where the configuration information includes information including configuration condition carried by a UE side, measurement configuration and the like. The network side can choose to accept the current configuration of the UE or choose to modify part of the configuration, or if the network side cannot interpret the configuration information to select full configuration, a source side transmits a handover command containing a destination side reconfiguration message to the UE. The handover command may include a dedicated random access configuration for the UE to access the target cell, so that the UE can initiate a non-contention random access process. The UE can acquire the random access related configuration information of the target cell through the handover command.

It can be seen that there are at least the following problems in the related art, when a terminal is switched, the terminal can only be switched to a cell without BWP division, and if the terminal is switched to a cell with a plurality of BWPs, the problem of selecting an accessed BWP has not yet been solved.

SUMMARY

Embodiments of the present disclosure provide a handover method, a terminal and network side equipment, to solve the problem of selection of an accessed BWP when a terminal is switched to a cell with a plurality of BWPs in the related art when the terminal is switched.

In a first aspect, an embodiment of the present disclosure provides a handover method which is applied to a terminal, and the method includes: receiving a handover command transmitted by a target cell of a network side through a source cell, where the handover command includes bandwidth access information of the target cell, and the bandwidth access information is information of a determined BWP configured to access the target cell; and accessing the target cell on the BWP so that the terminal is switched from the source cell to the target cell.

In one embodiment, the bandwidth access information is as follows: information of a BWP containing a cell-level SSB in the target cell, where the determined BWP is the BWP containing the cell-level SSB; or, information of a BWP where a SSB associated with a measurement object configured for the terminal is located in the target cell, where the measurement object corresponds to a measurement report which triggers handover, and the determined BWP is the BWP where the SSB associated with the measurement object configured for the terminal is located; or, information of a default BWP in the target cell, where the determined BWP is the default BWP; or information of a BWP specified in the target cell, where the determined BWP is a BWP explicitly indicated in the handover command.

In one embodiment, the handover command or the bandwidth access information further includes indication information for indicating the determined BWP, and the indication information includes one or more of following information: a random access resource corresponding to the BWP, a random access preamble corresponding to the BWP, explicit or implicit indication for a default BWP resource position, and indication information of a specified BWP.

In a second aspect, an embodiment of the present disclosure provides a handover method which is applied to the network side and includes: transmitting a handover command to the terminal through the source cell, where the handover command includes bandwidth access information of the target cell of the network side, so that the terminal accesses the target cell according to the BWP determined by the bandwidth access information and configured to access the target cell; and receiving a random access request for accessing the target cell transmitted by the terminal through the BWP, and completing a random access process to enable the terminal to be switched from the source cell to the target cell.

In one embodiment, the bandwidth access information is as follows: information of a BWP containing a cell-level SSB in the target cell, where the determined BWP is the BWP containing the cell-level SSB; or, information of a BWP where a SSB associated with a measurement object configured for the terminal is located in the target cell, where the measurement object corresponds to a measurement report which triggers handover, and the determined BWP is the BWP where the SSB associated with the measurement object configured for the terminal is located; or, information of a default BWP in the target cell, where the determined BWP is the default BWP; or, information of a BWP specified in the target cell, where the determined BWP is a BWP explicitly indicated in the handover command.

In one embodiment, the handover command or the bandwidth access information further includes indication information for indicating the determined BWP, where the indication information includes one or more of the following information: a random access resource corresponding to the BWP, a random access preamble corresponding to the BWP, explicit or implicit indication for a default BWP resource position, and indication information of a specified BWP.

In a third aspect, an embodiment of the present disclosure provides a terminal, and the terminal includes: a receiving device configured to receive the handover command transmitted by the target cell of the network side through the source cell, where the handover command includes bandwidth access information of the target cell, and the bandwidth access information is information of the determined BWP for accessing the target cell; and an access device configured to access the target cell on the BWP so that the terminal is switched from the source cell to the target cell.

In one embodiment, the bandwidth access information is as follows: information of a BWP containing a cell-level SSB in the target cell, where the determined BWP is the BWP containing the cell-level SSB; or, information of a BWP where a SSB associated with a measurement object configured for the terminal is located in the target cell, where the measurement object corresponds to a measurement report which triggers handover, and the determined BWP is the BWP where the SSB associated with the measurement object configured for the terminal is located; or, information of a default BWP in the target cell, where the determined BWP is the default BWP; or, information of a BWP specified in the target cell, where the determined BWP is a BWP explicitly indicated in the handover command.

In one embodiment, the handover command or the bandwidth access information further includes indication information for indicating the determined BWP, and the indication information includes one or more pieces of the following information: a random access resource corresponding to the BWP, a random access preamble corresponding to the BWP, explicit or implicit indication for a default BWP resource position, and indication information of a specified BWP.

In a fourth aspect, an embodiment of the present disclosure provides network side equipment, and the network side equipment includes: a transmitting device configured to transmit the handover command to the terminal through the source cell, where the handover command includes bandwidth access information of the target cell of the network side, so that the terminal accesses the target cell according to the BWP determined by the bandwidth access information and configured to access the target cell; and a receiving device configured to receive a random access request for accessing the target cell which is transmitted by the terminal through the BWP, where a random access process is completed for switching the terminal from the source cell to the target cell.

In one embodiment, the bandwidth access information is as follows: information of a BWP containing a cell-level SSB in the target cell, where the determined BWP is the BWP containing the cell-level SSB; or, information of a BWP where a SSB associated with a measurement object configured for the terminal is located in the target cell, where the measurement object corresponds to a measurement report which triggers handover, and the determined BWP is the BWP where the SSB associated with the measurement object configured for the terminal is located; or, information of a default BWP in the target cell, where the determined BWP is the default BWP; or, information of a BWP specified in the target cell, where the determined BWP is a BWP explicitly indicated in the handover command.

In one embodiment, the handover command or the bandwidth access information further includes indication information for indicating the determined BWP, and the indication information includes one or more pieces of the following information: a random access resource corresponding to the BWP, a random access preamble corresponding to the BWP, explicit or implicit indication for a default BWP resource position, and indication information of a specified BWP.

In a fifth aspect, an embodiment of the present disclosure provides a computer device, the device includes a processor for implementing the operations of the method in the embodiment of the first or second aspect when executing one or more computer programs stored in a memory.

In a sixth aspect, an embodiment of the present disclosure provides a computer readable storage medium, one or more computer programs are stored on the computer readable storage medium, and when the one or more computer programs are executed by a processor, the operations of the method in the embodiment of the first or second aspect are implemented.

In a seventh aspect, an embodiment of the present disclosure provides a terminal, and the terminal includes: a processor, configured to read the programs in the memory and execute the following processes: receiving the handover command transmitted by the target cell of the network side through the source cell at the terminal, where the handover command includes bandwidth access information of the target cell; and the bandwidth access information is information of a determined bandwidth part (BWP) configured to access the target cell; enabling the terminal to access the target cell on the BWP so that the terminal is switched from the source cell to the target cell; and a transceiver configured to receive and transmit data under the control of the processor.

In one embodiment, the bandwidth access information is as follows: information of a BWP containing a cell-level synchronized signal block (SSB) in the target cell, where the determined BWP is the BWP containing the cell-level SSB; or, information of a BWP where a SSB associated with a measurement object configured for the terminal is located in the target cell, where the measurement object corresponds to a measurement report which triggers handover, and the determined BWP is the BWP where the SSB associated with the measurement object configured for the terminal is located; or, information of a default BWP in the target cell, where the determined BWP is the default BWP; or, information of a BWP specified in the target cell, where the determined BWP is a BWP explicitly indicated in the handover command.

In one embodiment, the handover command or the bandwidth access information further includes indication information for indicating the determined BWP, and the indication information includes one or more pieces of the following information: a random access resource corresponding to the BWP, a random access preamble corresponding to the BWP, explicit or implicit indication for a default BWP resource position, and indication information of a specified BWP.

In an eighth aspect, an embodiment of the present disclosure provides network side equipment, and the equipment includes: a processor configured to read the program in the memory and executes the following processes: transmitting the handover command to the terminal through the source cell, where the handover command includes bandwidth access information of the target cell of the network side, so that the terminal accesses the target cell according to the BWP determined by the bandwidth access information and configured to access the target cell; receiving a random access request for accessing the target cell transmitted by the terminal through the BWP, and completing a random access process to enable the terminal to be switched from the source cell to the target cell; and a transceiver configured to receive and transmit data under the control of the processor.

In one embodiment, the bandwidth access information is as follows: information of a BWP containing a cell-level SSB in the target cell, where the determined BWP is the BWP containing the cell-level SSB; or, information of a BWP where a SSB associated with a measurement object configured for the terminal is located in the target cell, where the measurement object corresponds to a measurement report which triggers handover, and the determined BWP is the BWP where the SSB associated with the measurement object configured for the terminal is located; or, information of a default BWP in the target cell, where the determined BWP is the default BWP; or, information of a BWP specified in the target cell, where the determined BWP is a BWP explicitly indicated in the handover command.

In one embodiment, the handover command or the bandwidth access information further includes indication information for indicating the determined BWP, and the indication information includes one or more pieces of the following information: a random access resource corresponding to the BWP, a random access preamble corresponding to the BWP, explicit or implicit indication for a default BWP resource position, and indication information of a specified BWP.

By adopting the solutions provided by the embodiments of the present disclosure, the terminal can be switched to a cell with a plurality of BWPs, the terminal can be switched to the BWP of the cell-level SSB of the target cell, or the default BWP configured on the network side or the BWP corresponding to the SSB associated with the measurement object, or the network side configures the BWP access indication information in the handover command, the terminal is allocated to access any BWP, therefore, the problem of selection of an accessed BWP when the terminal is switched to the cell with a plurality of BWPs is solved, to enhance the flexibility of switching the terminal to the target cell, and improve the user experience.

BRIEF DESCRIPTION OF THE DRAWINGS

FIG. 1 is a flowchart of a handover method on a terminal side provided by an embodiment of the present disclosure.

FIG. 2 is a flowchart of the handover method on a network side provided by the embodiment of the present disclosure.

FIG. 3 is a schematic diagram of a terminal provided by the embodiment of the present disclosure.

DETAILED DESCRIPTION OF THE EMBODIMENTS

Figure 4:
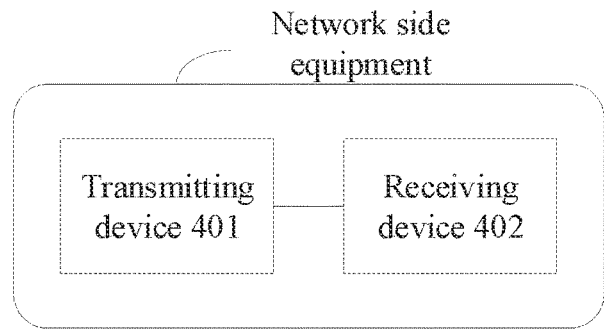
FIG. 4 is a schematic diagram of network side equipment provided by the embodiment of the present disclosure.

In order to solve the problem, the general idea of the embodiments of the present disclosure is as follows: a handover command transmitted by a target cell of a network side through a source cell includes bandwidth access information of the target cell, so that the terminal can access the target cell according to a BWP determined by the bandwidth access information and configured to access the target cell. According to embodiments of the present disclosure, the problem of selection of the accessed BWP when the terminal is switched to the cell with a plurality of BWPs is solved, to enhance the flexibility of switching the terminal to the target cell, and improve the user experience.

As shown in FIG. 1, a first embodiment of the present disclosure provides a handover method applied to a terminal, and the method includes the following operations.

S101, a handover command transmitted by a target cell of a network side through a source cell is received, and the handover command includes bandwidth access information of the target cell; and the bandwidth access information is information of a determined BWP for accessing the target cell.

S102, the target cell is accessed on the BWP to enable the terminal to be switched from the source cell to the target cell.

For S101, the terminal takes UE as an example. Signals of a network (such as a mobile network) side are measured at the UE, then the UE transmits a measurement report to a currently connected source cell. After the currently connected source cell receives the measurement report, if it is determined that the UE needs to be switched to the target cell, the source cell transmits a handover preparation request to the target cell. After receiving the handover preparation request of the source cell, the target cell configures the UE, and transmits a handover command to the UE through the source cell. The UE receives the handover command of the target cell through the source cell, where the handover command includes bandwidth access information of the target cell of the network side. The bandwidth access information is information of a BWP for accessing the target cell, and the handover command may include random access configuration information of the target BWP configured by the target cell for the UE. The random access configuration information includes common random access configuration information of the BWP and/or specific random access configuration information of the BWP allocated to the UE by the target cell.

After S101 is executed, S102 is executed and includes the following operations.

Specifically, the content that the UE accesses the target cell according to the BWP determined by the bandwidth access information in the handover command and configured to access the target cell includes that the UE initiates a random access process, and accesses the target cell on the BWP. The bandwidth access information in the handover command is information of the determined BWP configured to access the target cell. The handover command or the bandwidth access information further includes indication information for indicating the determined BWP, and the indication information includes one or more of the following information: a random access resource corresponding to the BWP, a random access preamble corresponding to the BWP, explicit or implicit indication for a default BWP resource position, and indication information of a specified BWP.

For example, according to the explicit indication information, an indication may be configured to indicate one BWP at a resource location as a default BWP; according to the implicit indication information, the first BWP or the last BWP in a bandwidth access information list is set as a default BWP, or the default BWP and other bandwidth access information are separately indicated by different information elements (IEs).

Based on difference of information of BWP included in the bandwidth access information, the embodiment can specifically have at least, but not limited to, the following implementation modes.

In a first mode, the UE receives the handover command, where the handover command includes bandwidth access information of the target cell, and the bandwidth access information is information of a BWP containing a cell-level SSB in the target cell; the UE accesses the target cell at the determined BWP configured to access the target cell according to the bandwidth access information, where the BWP is the BWP containing the cell-level SSB, for example, an initial BWP; the UE accesses the target cell on the BWP containing the cell-level SSB; and the UE transmits a reconfiguration complete message to the target cell.

In a second mode, the UE receives the handover command, where the handover command includes bandwidth access information of the target cell, and the bandwidth access information is information of a BWP where a SSB associated with a measurement object configured by the terminal is located in the target cell; and the measurement object corresponds to a measurement report which triggers handover; the UE accesses the target cell at the determined BWP configured to access the target cell according to the bandwidth access information, where the BWP is the BWP where the SSB associated with the measurement object configured by the terminal is located; and the UE accesses the target cell on the BWP where the SSB associated with the measurement object configured by the terminal is located. The UE transmits a reconfiguration complete message to the target cell.

In a third mode, the UE receives the handover command, where the handover command includes bandwidth access information of the target cell, and the bandwidth access information is information of a default BWP in the target cell; the UE accesses the target cell at the determined BWP configured to access the target cell according to the bandwidth access information, where the BWP is a default BWP in the target cell; the UE accesses the target cell on the default BWP; and the UE transmits a reconfiguration complete message to the target cell.

In a fourth mode, the UE receives the handover command, where the handover command includes the bandwidth access information of the target cell, and the bandwidth access information is information of a BWP specified in the target cell; the UE accesses the target cell according to the BWP determined by the bandwidth access information and configured to access the target cell, where the bandwidth part is the BWP explicitly indicated in the handover command; the UE accesses the target cell on the BWP indicated explicitly; and the UE transmits a reconfiguration complete message to the target cell.

For example, according to the explicit indication, for the indication information, an indication can be configured to indicate a BWP which can be used by the UE to access the target cell.

As shown in FIG. 2, in the second aspect, an embodiment of the present disclosure provides a handover method which is applied to network side equipment and includes the following operations.

S201, a handover command is transmitted to a terminal through a source cell, where the handover command includes bandwidth access information of the target cell of a network side, so that the terminal accesses the target cell according to the BWP determined by the bandwidth access information and configured to access the target cell.

S202, a random access request for accessing the target cell transmitted by the terminal through the BWP is received, and a random access process is completed, so that the terminal is switched from the source cell to the target cell.

For S201, the terminal may take the UE as an example as follows: the UE measures a network (such as a mobile network) side signal, and then the UE transmits a measurement report to a currently connected source cell; after the source cell receives the measurement report, if it is determined that the UE needs to be switched to the target cell, the source cell transmits a handover preparation request to the target cell of the network side; after receiving the handover preparation request of the source cell, the target cell configures the UE, and transmits the handover command the UE through the source cell, where the handover command includes bandwidth access information of the target cell of the network side; and the UE accesses the target cell according to the BWP determined by the bandwidth access information and configured to access the target cell. The bandwidth access information is information of a BWP for accessing the target cell, and the handover command may include random access configuration information of the target BWP configured by the target cell for the UE. The random access configuration information includes common random access configuration information of the BWP and/or dedicated random access configuration information of the BWP allocated to the UE by the target cell. The target cell is a cell having a plurality of BWPs.

The handover command or the bandwidth access information further includes indication information for indicating the determined BWP, and the indication information includes one or more of the following information: a random access resource corresponding to the BWP, a random access preamble corresponding to the BWP, explicit or implicit indication for a default BWP resource position, and indication information of a specified BWP.

For example, according to the explicit indication information, an indication can be configured to indicate one BWP at a resource location as a default BWP; and according to the implicit indication information, the first BWP or the last BWP in the bandwidth access information list is set as the default BWP or the default BWP and other bandwidth access information are separately indicated through different IEs.

After execution of S201, step S202 is executed and includes: a random access request for accessing the target cell transmitted by the UE through the BWP is received, and a random access process is completed to enable the UE to be switched from the source cell to the target cell.

After receiving the reconfiguration complete message of the UE, the network side equipment can reconfigure the UE, and the like.

Based on the difference of information of BWP included in the bandwidth access information, the embodiment can specifically have at least, but not limited to, the following implementation modes.

In a first mode, the handover command is transmitted to the UE through the source cell, where the handover command includes bandwidth access information configured for the UE, the bandwidth access information is information of a BWP containing a cell-level SSB of the target cell; after receiving the handover command, the UE accesses the target cell according to the BWP determined by the bandwidth access information and configured to access the target cell, where the bandwidth part is the BWP containing the cell-level SSB; and the random access request for accessing the target cell transmitted by the UE through the BWP containing the cell-level SSB is received, and the random access process is completed to enable the UE to be switched from the source cell to the target cell of the network side. The UE may be reconfigured after the reconfiguration complete message for the UE is received.

In a second mode, the handover command is transmitted to the UE through the source cell, where the handover command includes bandwidth access information configured for the UE, and the bandwidth access information is information of a BWP where a SSB associated with a measurement object configured by the terminal is located in the target cell; after receiving the handover command, the UE accesses the target cell according to the BWP determined by the bandwidth access information and configured to access the target cell, where the BWP is the BWP where the SSB associated with the measurement object configured by the terminal is located in the target cell, and the measurement object corresponds to a measurement report which triggers handover; and the random access request for accessing the target cell transmitted by the UE through the BWP where the SSB associated with the measurement object configured by the terminal is located is received, and the random access process is completed to enable the UE to be switched from the source cell to the target cell of the network side. The UE may be reconfigured after the reconfiguration complete message for the UE is received.

In a third mode, the handover command is transmitted to the UE through the source cell, where the handover command includes bandwidth access information configured for the UE, the bandwidth access information is information of a default BWP in the target cell; after receiving the handover command, the UE accesses the target cell according to the BWP determined by the bandwidth access information and configured to access the target cell, where the bandwidth part is the default BWP; and the random access request for accessing the target cell transmitted by the UE through the default BWP is received, and the random access process is completed to enable the UE to be switched from the source cell to the target cell of the network side. The UE may be reconfigured after the reconfiguration complete message for the UE is received.

In a fourth mode, the handover command is transmitted to the UE through the source cell, where the handover command includes bandwidth access information configured for the UE. The bandwidth access information is information of a BWP specified in the target cell; after receiving the handover command, the UE accesses the target cell according to the BWP determined by the bandwidth access information and configured to access the target cell, and the bandwidth part is the BWP explicitly indicated in the handover command; and the random access request for accessing the target cell transmitted by the UE through the BWP explicitly indicated in the handover command is received, and the random access process is completed to enable the UE to be switched from the source cell to the target cell of the network side.

For example, according to the explicit indication, for the indication information, an indication can be configured to indicate the BWP which can be used by the UE to access the target cell.

The UE may be reconfigured after the reconfiguration complete message for the UE is received.

As shown in FIG. 3, in a third aspect, an embodiment of the present disclosure provides a terminal, and the terminal includes a receiving device 301 and an access device 302.

A receiving device 301 is configured to receive the handover command transmitted by the target cell of the network side through the source cell. The handover command includes bandwidth access information of the target cell; and the bandwidth access information is information of the determined BWP for accessing the target cell.

An access device 302 is configured to access the target cell on the BWP to enable the terminal to be switched from the source cell to the target cell.

A terminal takes UE as an example, a network (such as a mobile network) side signal is measured at the UE, then the UE transmits a measurement report to the currently connected source cell. After the currently connected source cell receives the measurement report, if it is determined that the UE needs to be switched to the target cell, the source cell transmits a handover preparation request to the target cell. After receiving the handover preparation request of the source cell, the target cell configures the UE, and transmits a handover command to the UE through the source cell. Then the receiving device 301 receives the handover command transmitted by the target cell of the network side through the source cell, where the handover command includes bandwidth access information. The bandwidth access information is information of a BWP for accessing the target cell, and the handover command may include random access configuration information of the target BWP configured by the target cell for the UE. The random access configuration information includes common random access configuration information of the BWP and/or dedicated random access configuration information of the BWP allocated to the UE by the target cell. The access device 302 accesses the target cell on the determined BWP so that the terminal is switched from the source cell to the target cell.

In particular, the content that the UE accesses the target cell according to the BWP determined by the bandwidth access information in the handover command and configured to access the target cell includes that the UE initiates a random access process, and the access device 302 accesses the target cell on the BWP. The bandwidth access information in the handover command is information of the determined BWP configured to access the target cell. The handover command or the bandwidth access information further includes indication information for indicating the determined BWP, and the indication information includes one or more of the following information: a random access resource corresponding to the BWP, a random access preamble corresponding to the BWP, explicit or implicit indication for a default BWP resource position, and indication information of a specified BWP.

Based on difference of information of BWP included in the bandwidth access information, the embodiment can specifically have at least, but not limited to, the following implementation modes.

In a first mode, the receiving device 301 receives the handover command, where the handover command includes bandwidth access information of the target cell, and the bandwidth access information is information of a BWP containing a cell-level SSB of the target cell; and the bandwidth access information is information of the determined BWP for accessing the target cell, and the BWP is the BWP containing the cell-level SSB, for example, an initial BWP; the access device 302 accesses the target cell on the BWP containing the cell-level SSB; and the UE transmits a reconfiguration complete message to the target cell.

In a second mode, the receiving device 301 receives the handover command, where the handover command includes bandwidth access information of the target cell, and the bandwidth access information is information of a BWP where a SSB associated with a measurement object configured by the terminal is located in the target cell; the measurement object corresponds to a measurement report which triggers handover; the bandwidth access information is the information of the determined BWP configured to access the target cell, and the BWP is the BWP where the SSB associated with the measurement object configured by the terminal is located; and the access device 302 accesses the target cell on the BWP where the SSB associated with the measurement object configured by the terminal is located. The UE transmits the reconfiguration complete message to the target cell.

In a third mode, the receiving device 301 receives the handover command, the handover command includes bandwidth access information of the target cell, and the bandwidth access information is information of a default BWP in the target cell; and the bandwidth access information is information of the determined BWP configured to access the target cell, and the bandwidth part includes the default BWP in the target cell; the access device 302 accesses the target cell on the default BWP; and the UE transmits the reconfiguration complete message to the target cell.

In a fourth mode, the receiving device 301 receives the handover command, the handover command includes bandwidth access information of the target cell, and the bandwidth access information is information of the BWP specified in the target cell; and the bandwidth access information is the information of the determined BWP configured to access the target cell, and the BWP is the BWP explicitly indicated in the handover command; the access device 302 accesses the target cell on the BWP indicated explicitly; and the UE transmits the reconfiguration complete message to the target cell.

For example, according to the explicit indication, for indication information, an indication can be configured to indicate the BWP which can be used by the UE to access the target cell.

As shown in FIG. 4, in a fourth aspect, an embodiment of the present disclosure provides network side equipment which includes a transmitting device 401 and a receiving device 402.

A transmitting device 401 is configured to transmit the handover command to the terminal through the source cell, the handover command includes bandwidth access information of the target cell of the network side, so that the terminal accesses the target cell according to the determined BWP configured to access the target cell.

A receiving device 402 is configured to receive a random access request for accessing the target cell transmitted by the terminal through the BWP, and a random access process is completed for switching the terminal from the source cell to the target cell.

The terminal takes the UE as an example, and the UE measures a network (such as a mobile network) side signal, then the UE transmits a measurement report to the currently connected source cell; after the source cell receives the measurement report, if it is determined that the UE needs to be switched to the target cell, the source cell transmits a handover preparation request to the target cell of the network side; after receiving the handover preparation request of the source cell, the target cell configures the UE, the transmitting device 401 in the network side equipment transmits the handover command to the UE through the source cell, where the handover command includes bandwidth access information of the target cell of the network side; and the UE accesses the target cell at the determined BWP for accessing the target cell according to the bandwidth access information; the bandwidth access information is information of the BWP configured to access the target cell, and the handover command may include random access configuration information of the target BWP configured by the target cell for the UE. The random access configuration information includes common random access configuration information of the BWP and/or dedicated random access configuration information of the BWP allocated to the UE by the target cell.

The handover command or the bandwidth access information further includes indication information for indicating the determined BWP, and the indication information includes one or more of the following information: a random access resource corresponding to the BWP, a random access preamble corresponding to the BWP, explicit or implicit indication for a default BWP resource position, and indication information of a specified BWP.

For example, according to the explicit indication information, an indication can be configured to indicate one BWP at a resource location as a default BWP; and according to the implicit indication information, the first BWP or the last BWP in the bandwidth access information list is set as the default BWP or the default BWP and other bandwidth access information are separately indicated through different IEs.

After the transmitting device 401 transmits the handover command to the UE through the source cell, the receiving device 402 receives the random access request transmitted by the UE through the BWP to access the target cell, and the random access process is completed to enable the UE to be switched from the source cell to the target cell.

After the network side equipment receives the reconfiguration complete message of the UE, the UE can be reconfigured by the network side equipment.

Based on the difference of the information of the BWP included in the bandwidth access information, the embodiment can specifically have at least, but not limited to, the following implementation modes.

In a first mode, the transmitting device 401 transmits the handover command to the UE through the source cell, and the handover command includes bandwidth access information configured for the UE. The bandwidth access information is information of a BWP containing a cell-level SSB in the target cell; after receiving the handover command, the UE accesses the target cell according to the BWP determined by the bandwidth access information and configured to access the target cell, and the BWP is the BWP containing the cell-level SSB and accesses the target cell; and the receiving device 402 receives a random access request for accessing the target cell transmitted by the BWP containing the cell-level SSB, and the random access process is completed for switching the UE from the source cell to the target cell of the network side.

The reconfiguration complete message of the UE is received by the network side equipment, and the UE can be reconfigured.

In a second mode, the transmitting device 401 transmits the handover command to the UE through the source cell, and the handover command includes bandwidth access information configured for the UE. The bandwidth access information is information of a BWP where a SSB associated with a measurement object configured by the terminal is located in the target cell; after receiving the handover command, the UE accesses the target cell according to the BWP determined by the bandwidth access information and configured to access the target cell, and the bandwidth part is the BWP where the SSB associated with the measurement object configured by the terminal is located in the target cell, where the measurement object corresponds to a measurement report which triggers handover; and the receiving device 402 receives the random access request for accessing the target cell transmitted by the BWP where the SSB associated with the measurement object configured by the terminal is located, and the random access process is completed for switching the UE from the source cell to the target cell of the network side.

The reconfiguration complete message of the UE is received by the network side equipment, and the UE can be reconfigured.

In a third mode, the transmitting device 401 transmits the handover command to the UE through the source cell, and the handover command includes bandwidth access information configured for the UE. The bandwidth access information is information of the default BWP in the target cell; and after receiving the handover command, the UE accesses the target cell according to the BWP determined by the bandwidth access information and configured to access the target cell, and the BWP is the default BWP; and the receiving device 402 receives the random access request for accessing the target cell transmitted through the default BWP, and the random access process is completed for switching the UE from the source cell to the target cell of the network side. The reconfiguration complete message of the UE is received by the network side equipment, and the UE can be reconfigured.

In a fourth mode, the transmitting device 401 transmits the handover command to the UE through the source cell, and the handover command includes bandwidth access information configured for the UE. The bandwidth access information is information of the BWP specified in the target cell; after receiving the handover command, the UE accesses the target cell according to the BWP determined by the bandwidth access information and configured to access the target cell, and the BWP is the BWP explicitly indicated in the handover command; and the receiving device 402 receives the random access request for accessing the target cell transmitted by the UE through the BWP explicitly indicated in the handover command, and the random access process is completed for switching the UE from the source cell to the target cell of the network side.

For example, according to the explicit indication, for indication information, an indication can be configured to indicate the BWP which can be used by the UE to access the target cell.

The reconfiguration complete message of the UE is received on the network side, and the UE can be reconfigured.

In a fifth aspect, an embodiment of the present disclosure provides a computer device including a processor for implementing the operation of the method of a first embodiment or a second embodiment when executing a computer program stored in a memory.

In a sixth aspect, an embodiment of the present disclosure provides a computer readable storage medium, a computer program is stored on the computer readable storage medium, and when the computer program is executed by the processor, the operations of the method of the first embodiment or the second embodiment are implemented.

In a seventh aspect, an embodiment of the present disclosure provides network side equipment which can be implemented according to the following modes.

Figure 5:
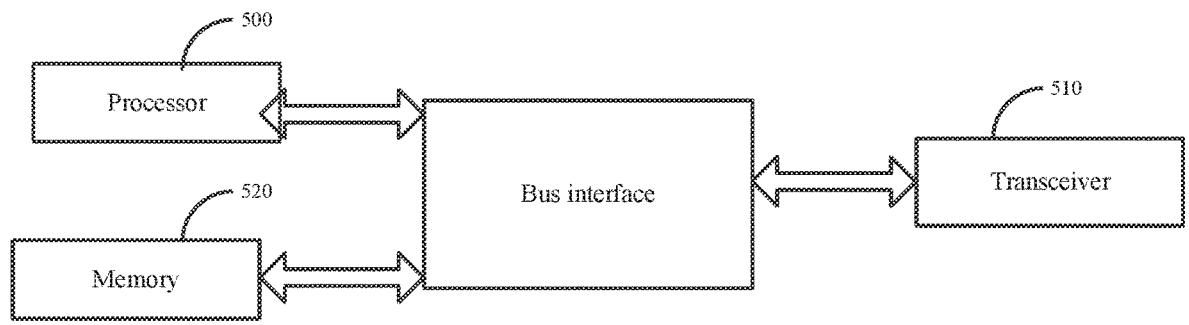
FIG. 5 is a schematic diagram of the network side equipment provided by the embodiment of the present disclosure.

FIG. 5 is a structure diagram of network side equipment, and as shown in the figure, the network side equipment includes: a processor 500 configured to read programs in a memory 520 and execute the following processes: transmitting a handover command to the terminal through a source cell, where the handover command includes bandwidth access information of the target cell of the network side, so that the terminal accesses the target cell according to the BWP determined by the bandwidth access information and configured to access the target cell; receiving a random access request of accessing the target cell transmitted by the terminal through the BWP, and completing a random access process to enable the terminal to be switched from the source cell to the target cell; and a transceiver 510 configured to receive and transmit data under the control of the processor 500.

In implementation, the bandwidth access information is as follows: information of a BWP containing a cell-level SSB in the target cell, where the determined BWP is the BWP containing the cell-level SSB; or, information of a BWP where a SSB associated with a measurement object configured for the terminal is located in the target cell, where the measurement object corresponds to a measurement report which triggers handover, and the determined BWP is the BWP where the SSB associated with the measurement object configured for the terminal is located; or, information of a default BWP in the target cell, where the determined BWP is the default BWP; or, information of a BWP specified in the target cell, where the determined BWP is the BWP explicitly indicated in the handover command.

In implementation, the handover command or the bandwidth access information further includes indication information for indicating the determined BWP, and the indication information includes one or more of the following information: a random access resource corresponding to the BWP, a random access preamble corresponding to the BWP, explicit or implicit indication for a default BWP resource position, and indication information of a specified BWP.

In FIG. 5, a bus architecture may include any number of interconnected buses and bridges, particularly various circuits of one or more processors represented by the processor 500 and a memory represented by the memory 520 are linked together. In the bus architecture, various other circuits such as peripheral equipment, voltage regulators and power management circuits can further be linked together, and it is well known in the art, and thus will not be described further herein. A bus interface provides an interface. The transceiver 510 may be a plurality of elements including a transmitter and a transceiver, and units for communicating with various other devices on a transmission medium are provided. The processor 500 is responsible for managing the bus architecture and general processing, and the memory 520 may store data used by the processor 500 in performing operations.

In an eighth aspect, an embodiment of the present disclosure provides a terminal which can be implemented according to the following mode.

Figure 6:
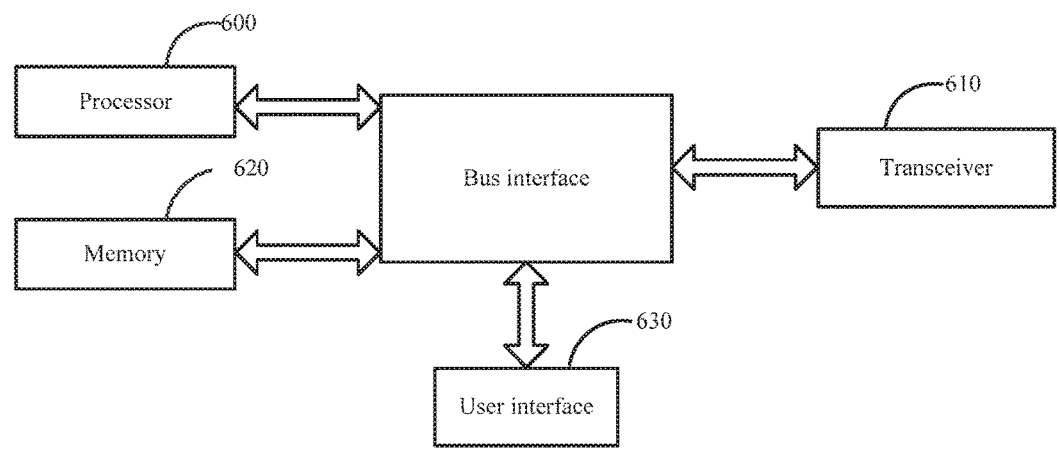
FIG. 6 is a schematic diagram of the terminal provided by the embodiment of the present disclosure.

FIG. 6 is a structure diagram of the terminal, and as shown in the figure, the terminal includes: a processor 600 configured to read the program in the memory 620 and executes the following processes: receiving a handover command transmitted by a target cell of a network side through a source cell at the terminal, where the handover command includes bandwidth access information of the target cell; and the bandwidth access information is information of the determined bandwidth part (BWP) configured to access the target cell; enabling the terminal to access the target cell on the BWP to enable the terminal to be switched from the source cell to the target cell; and a transceiver 610 configured to receive and transmit data under the control of the processor 600.

In implementation, the bandwidth access information is as follows: information of a BWP containing a cell-level synchronized signal block (SSB) in the target cell, where the determined BWP is the BWP containing the cell-level SSB; or, information of a BWP where a SSB associated with a measurement object configured for the terminal is located in the target cell, where the measurement object corresponds to a measurement report which triggers handover, and the determined BWP is the BWP where the SSB associated with the measurement object configured for the terminal is located; or, information of a default BWP in the target cell, where the determined BWP is the default BWP; or, information of a BWP specified in the target cell, where the determined BWP is a BWP explicitly indicated in the handover command.

In implementation, the handover command or the bandwidth access information further includes indication information for indicating the determined BWP, and the indication information includes one or more of the following information: a random access resource corresponding to the BWP, a random access preamble corresponding to the BWP, explicit or implicit indication for a default BWP resource position, and indication information of a specified BWP.

In FIG. 6, the bus architecture may include any number of interconnected buses and bridges, particularly various circuits of one or more processors represented by the processor 600 and a memory represented by the memory 620 are linked together. In the bus architecture, various other circuits such as peripheral equipment, voltage regulators and power management circuits may also be linked together, and it is well known in the art, and thus will not be described further herein. A bus interface provides the interface. The transceiver 610 may be a plurality of elements including a transmitter and a receiver, and the units for communicating with various other devices on the transmission medium are provided. For different user equipment, a user interface 630 may also be an interface being internally and externally connected with required equipment, and the connected equipment includes, but not limited to, a keypad, a display, a loudspeaker, a microphone and a joystick.

The processor 600 is responsible for managing the bus architecture and general processing, and the memory 620 may store data used by the processor 600 in performing operations.

The embodiments of the present disclosure, the terminal can be switched to a cell with a plurality of BWPs, the terminal can be switched to the BWP of the cell-level SSB of the target cell, or the default BWP configured by the network side or the BWP corresponding to the SSB associated with the measurement object or the network side configures BWP access indication information in the handover command, the terminal is allocated to access any BWP, therefore, the problem of selection of the accessed BWP when the terminal is switched to the cell with a plurality of BWPs is solved, to enhance the flexibility of switching the terminal to the target cell, and improve the user experience.

Although embodiments of the present disclosure have been described, additional variations and modifications of these embodiments can be made. It is therefore intended that the appended claims are interpreted as including the embodiments and all such alterations and modifications that fall within the scope of the present disclosure.

The invention claimed is:

1. A handover method applicable to a terminal in a communication system, wherein a system bandwidth of the communication system are divided into a plurality of bandwidth parts (BWPs), and the communication system configures one or more BWPs of the plurality of BWPs for the terminal, and the method comprises:
    specifying bandwidth access information with a target cell, wherein the bandwidth access information identifies a BWP to access the target cell;
    receiving a handover command transmitted by the target cell of a network side through a source cell, wherein the handover command comprises the bandwidth access information of the target cell;
    determining the BWP from the one or more BWPs based on the bandwidth access information comprised in the handover command, wherein the BWP is a BWP explicitly indicated in the handover command by the bandwidth access information; and
    on the basis of the determining the BWP, transmitting a random access request for accessing the target cell through the BWP, completing a random access process and accessing the target cell on the BWP to enable the terminal to be switched from the source cell to the target cell.

2. The method according to claim 1, wherein the handover command or the bandwidth access information further comprises indication information for indicating the determined BWP, and the indication information comprises one or more of following information: a random access resource corresponding to the BWP, a random access preamble corresponding to the BWP, explicit or implicit indication for a default BWP resource position, and indication information of a specified BWP.

3. A handover method applicable to a network side in a communication system, wherein a system bandwidth of the communication system are divided into a plurality of bandwidth parts (BWPs) and the communication system configures one or more BWPs of the plurality of BWPs for a terminal, and the method comprises:

transmitting a handover command to the terminal through a source cell, wherein the handover command comprises bandwidth access information of a target cell of a network side, to enable the terminal to determine a BWP from the one or more BWPs based on the bandwidth access information comprised in the handover command and access the target cell on the BWP explicitly indicated in the handover command by the bandwidth access information, wherein the bandwidth access information is specified with the target cell and identifies the BWP to access the target cell; and receiving a random access request for accessing the target cell transmitted by the terminal through the BWP, and completing a random access process to enable the terminal to be switched from the source cell to the target cell.

4. The method according to claim 3, wherein the handover command or the bandwidth access information further comprises indication information for indicating the determined BWP, and the indication information comprises one or more of following information: a random access resource corresponding to the BWP, a random access preamble corresponding to the BWP, explicit or implicit indication for a default BWP resource position, and indication information of a specified BWP.

5. A terminal, comprising: a processor and a memory, wherein the processor is configured to read programs in the memory and execute the method of claim 1; and a transceiver configured to receive and transmit data under control of the processor.

6. The terminal according to claim 5, wherein the handover command or the bandwidth access information further comprises indication information for indicating the determined BWP, and the indication information comprises one or more of following information: a random access resource corresponding to the BWP, a random access preamble corresponding to the BWP, explicit or implicit indication for a default BWP resource position, and indication information of a specified BWP.

7. Network side equipment in a communication system, wherein a system bandwidth of the communication system are divided into a plurality of bandwidth parts (BWPs) and the communication system configures one or more BWPs of the plurality of BWPs for a terminal, and the network side equipment comprises:

a processor configured to read programs in a memory and execute following processes:

transmitting a handover command to the terminal through a source cell, wherein the handover command comprises bandwidth access information of a target cell of a network side, to enable the terminal to determine a BWP from the one or more BWPs based on the bandwidth access information comprised in the handover command and access the target cell on the BWP explicitly indicated in the handover command by the bandwidth access information, wherein the bandwidth access information is specified with the target cell and identifies the BWP to access the target cell;

receiving a random access request for accessing the target cell transmitted by the terminal through the BWP, and completing a random access process to enable the terminal to be switched from the source cell to the target cell; and a transceiver configured to receive and transmit data under control of the processor.

8. The equipment according to claim 7, wherein the handover command or the bandwidth access information further comprises indication information for indicating the determined BWP, and the indication information comprises one or more of following information: a random access resource corresponding to the BWP, a random access preamble corresponding to the BWP, explicit or implicit indication for a default BWP resource position, and indication information of a specified BWP.

9. A non-transitory computer readable storage medium on which computer programs are stored, wherein the method according to claim 1 is implemented when the computer programs are executed by a processor.

10. The method according to claim 3, wherein the handover command or the bandwidth access information further comprises indication information for indicating the determined BWP, and the indication information comprises one or more of following information: a random access resource corresponding to the BWP, a random access preamble corresponding to the BWP, explicit or implicit indication for a default BWP resource position, and indication information of a specified BWP.

11. The terminal according to claim 5, wherein the handover command or the bandwidth access information further comprises indication information for indicating the determined BWP, and the indication information comprises one or more of following information: a random access resource corresponding to the BWP, a random access preamble corresponding to the BWP, explicit or implicit indication for a default BWP resource position, and indication information of a specified BWP.

12. The equipment according to claim 7, wherein the handover command or the bandwidth access information further comprises indication information for indicating the determined BWP, and the indication information comprises one or more of following information: a random access resource corresponding to the BWP, a random access preamble corresponding to the BWP, explicit or implicit indication for a default BWP resource position, and indication information of a specified BWP.

13. A non-transitory computer readable storage medium on which computer programs are stored, wherein the method according to claim 3 is implemented when the computer programs are executed by a processor.

* * * * *